Figure 1:
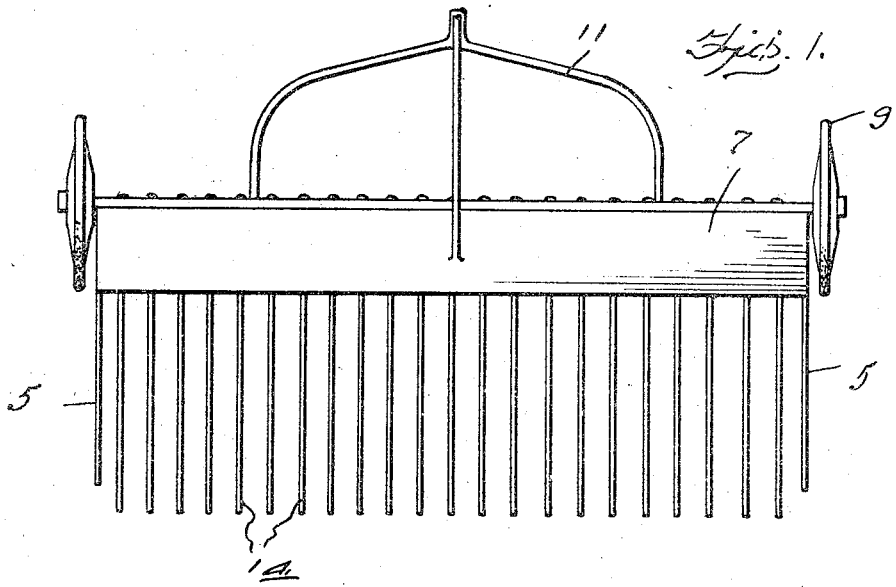

April 22, 1930.   J. P. KINSLEY   1,755,652
COMBINATION RAKE AND SNOW SHOVEL
Filed Dec. 17, 1928   2 Sheets-Sheet 1

Inventor
J. P. Kinsley
By Clarence A. O'Brien
Attorney

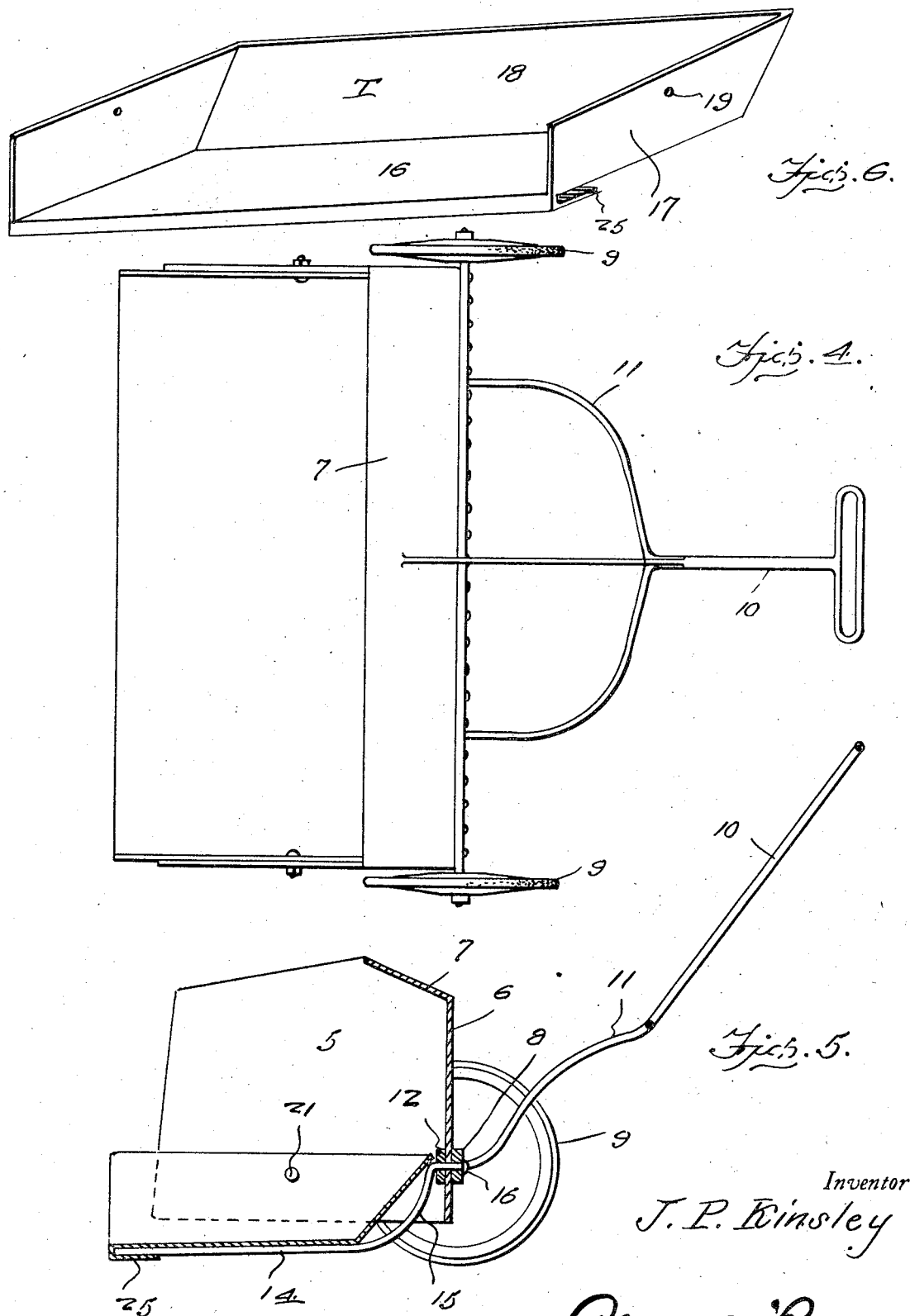

Patented Apr. 22, 1930

1,755,652

UNITED STATES PATENT OFFICE

JAMES P. KINSLEY, OF KIRKWOOD, MISSOURI, ASSIGNOR OF ONE-HALF TO LEWIS E. AGNEW, JR., OF KIRKWOOD, MISSOURI

COMBINATION RAKE AND SNOW SHOVEL

Application filed December 17, 1928. Serial No. 326,579.

The present invention relates to a combination rake and snow shovel and has for its prime object to provide a wheeled apparatus which may be used either as a rake or a snow shovel.

Another very important object of the invention resides in the provision of a device of this nature which is exceedingly simple in its construction, strong and durable, inexpensive to manufacture, easy to manipulate, thoroughly efficient and reliable in use, and otherwise well adapted to the purposes for which it is designed.

With the above and numerous other objects in view as will appear as the description proceeds, the invention resides in certain novel features of construction, and in the combination and arrangement of parts as will be hereinafter more fully described and claimed.

Figure 2:
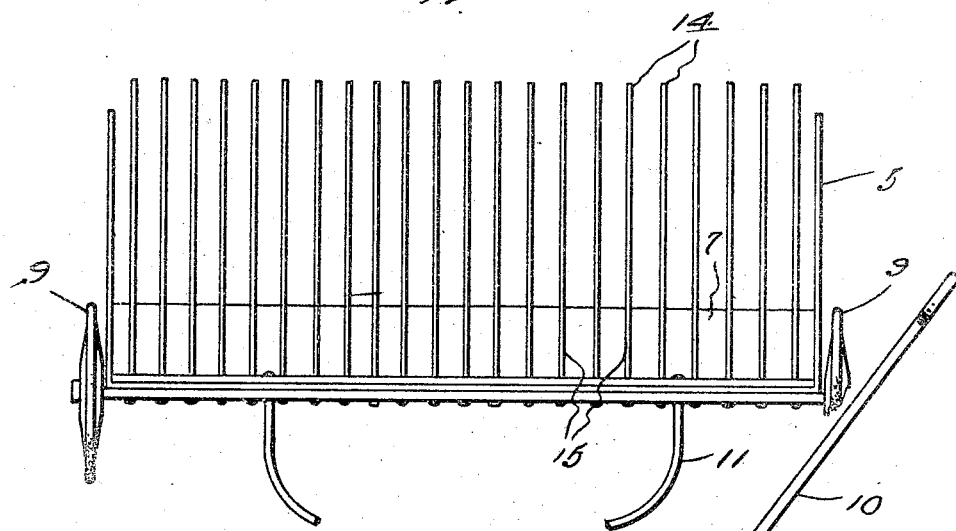
Figure 3:
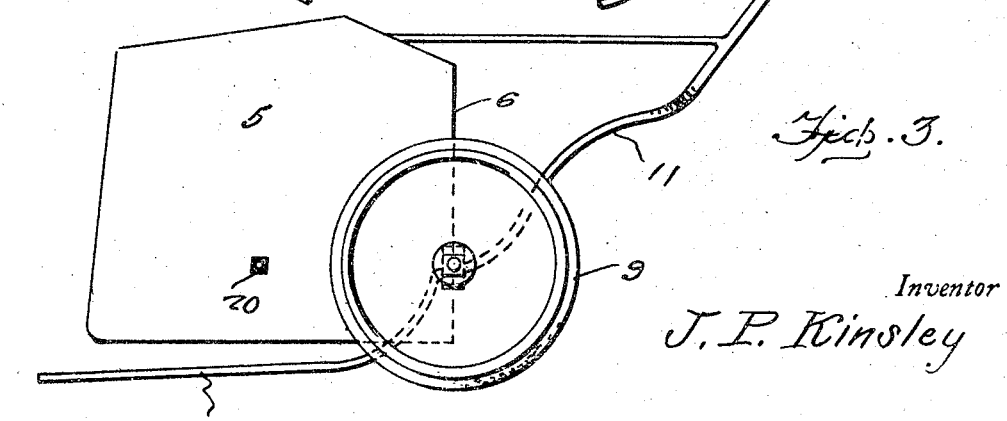

In the drawing:

Figure 1 is a top plan view of the apparatus embodying the features of my invention, Figure 2 is a bottom plan view thereof, Figure 3 is a side elevation thereof, Figure 4 is a top plan view with the shovel tray therein, Figure 5 is a vertical section therethrough, and Figure 6 is a perspective view of the tray.

Referring to the drawing in detail it will be seen that I provide a hood including side walls 5, a rear wall 6, and a top wall 7 which extends across the rear portions of the upper edges of the side walls 5 and the upper edge of the rear wall 6. An axle bar 8 extends across the rear face of the rear wall 6 adjacent the lower edge thereof and has wheels 9 journaled on the ends thereof at the sides of the apparatus.

A handle 10 is provided with bifurcations 11 anchored to the axle bar 8. A bracing bar 12 is disposed along the front face of the rear wall 6 adjacent the axle bar 8 and a plurality of tines 14 have their rear ends turned upwardly as at 15 terminating in rearwardly disposed ends 16 extending through the bars 12 and 8 and through the rear wall 6 and being anchored therein.

The letter T denotes generally a tray including a bottom 16, side walls 17, and an upwardly and rearwardly inclined rear wall 18. Openings 19 are provided in the side walls 17 and openings 20 are provided in the side walls 5 so that bolts 21 may be passed through these openings 19 and 20 to dispose the tray with the bottom resting on the tines 14.

The front edge of the bottom 16 is provided with an underhanging flange 25 to extend under the forward ends of the tines 14.

From the above detailed description it will be seen that I have devised a device which when the tray T is removed may be used as a rake for leaves, grass, hay, rubbish and the like and when the attachment is in place the same may be used for snow and the like.

The device is easy to handle after the material has been gathered therein and by pushing the apparatus along it will be seen that such material may be moved to the desired point of dumping.

It is thought that the construction, utility, operation and advantages of this invention will now be quite apparent to those skilled in this art without a more detailed description thereof. It will be seen that the embodiment of the invention illustrated herein is simple in its construction, may be made strong and durable and yet inexpensive without sacrificing its reliability and efficiency.

This embodiment of the invention, however, has been disclosed in detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. A device of the class described including a hood formed with side walls, a rear wall, and a top wall; an axle bar across the rear wall, wheels journaled on the ends of the axle bar, a handle connected with the axle bar, tines connected with the rear wall and the axle bar, and curving downwardly and forwardly below the bottom edges of the side walls.

2. A device of the class described including, in combination, a hood formed with side walls, a rear wall, and a top wall; an axle bar across the rear wall, wheels journaled on the ends of the axle bar, a handle connected with the axle bar, tines connected with the rear wall and the axle bar, and curving downwardly and forwardly below the bottom edges of the side walls, a tray including a bottom, side walls and rear wall, said bottom adapted to rest on the tines, means for anchoring the side walls of the tray to the side walls of the hood.

3. A device of the class described including, in combination, a hood formed with side walls, a rear wall, and a top wall; an axle bar across the rear wall, wheels journaled on the ends of the axle bar, a handle connected with the axle bar, tines connected with the rear wall and the axle bar, and curving downwardly and forwardly below the bottom edges of the side walls, a tray including a bottom, side walls and rear wall, said bottom adapted to rest on the tines, means for anchoring the side walls of the tray to the side walls of the hood, said tray being formed at the forward edge of its bottom with an underhanging flange to underhang the forward ends of the tines.

4. An apparatus of the class described including a hood comprising a pair of side walls, and a rear wall connecting the rear edges of the side walls; an axle bar across the rear face of the rear wall adjacent the lower edge thereof, a brace bar across the front face thereof adjacent the axle bar, wheels journaled on the ends of the axle bar, a plurality of tines including straight portions below the bottom edges of the side walls and terminating at their rear ends in upwardly curved portions merging in rearwardly disposed extensions passing through the two bars and the rear wall.

5. An apparatus of the class described including, in combination, a hood comprising a pair of side walls, and a rear wall connecting the rear edges of the side walls; an axle bar across the rear face of the rear wall adjacent the lower edge thereof, a brace bar across the front face thereof adjacent the axle bar, wheels journaled on the ends of the axle bar, a plurality of tines including straight portions below the bottom edges of the side walls and terminating at their rear ends in upwardly curved portions merging in rearwardly disposed extensions passing through the two bars and the rear wall, and a tray including a bottom resting on the tines and having at its forward edge an underhanging flange disposed under the forward ends of the tines.

In testimony whereof I affix my signature.

JAMES P. KINSLEY.